Figure 1:
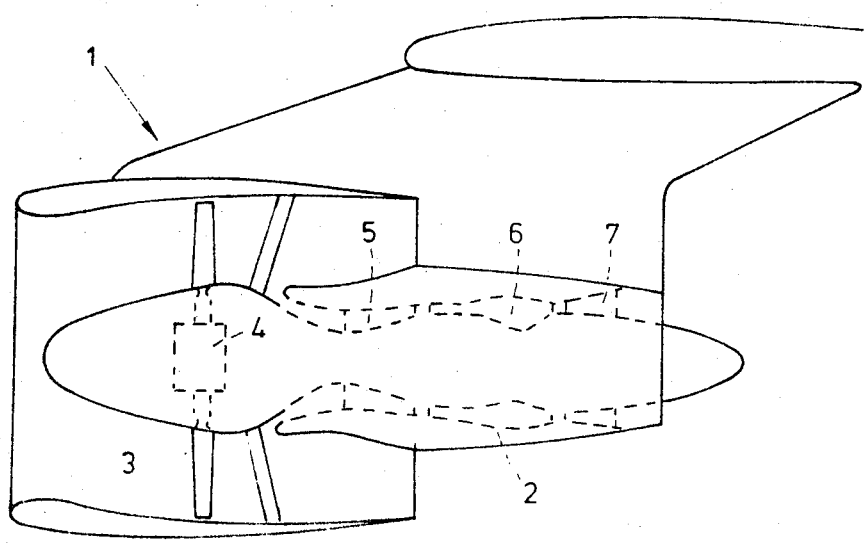

United States Patent [19]
Roberts

[11] 3,754,484
[45] Aug. 28, 1973

[54] GEARING

[75] Inventor: Martyn Grigson Roberts, Bristol, England

[73] Assignee: Secretary of State for Defence in Her Britannic Majesty's Government of the United Kingdom of Great Britain and Northern Ireland, London, England

[22] Filed: Jan. 3, 1972

[21] Appl. No.: 214,942

[30] Foreign Application Priority Data
  Jan. 8, 1971    Great Britain ........................ 946/71

[52] U.S. Cl. .................................... 74/801, 74/410
[51] Int. Cl. .......................... F16h 1/36, F16h 57/08
[58] Field of Search ...................... 74/801, 410, 761, 74/763

[56] References Cited
UNITED STATES PATENTS
1,968,604  7/1934  Hertz et al. ........................... 74/801
2,179,072  11/1939  Chilton et al. ........................ 74/801
2,700,312  1/1955  Smirl ................................... 74/763
2,825,247  3/1958  Haworth et al. ....................... 74/801
2,923,178  2/1960  Miller .................................. 74/761
2,971,385  2/1961  Miller ................................ 74/761 X
3,513,715  5/1970  Whitfield .......................... 74/801 X

*Primary Examiner*—Charles J. Myhre
*Assistant Examiner*—Thomas C. Perry
*Attorney*—Richard K. Stevens, Davidson C. Miller et al.

[57] ABSTRACT

In an epicyclic gear box all the teeth of the various gear wheels are of single helical form. The tipping couple produced on the planet wheels due to the helix angle of the teeth is balanced by displacing the sun and annulus gears in opposite directions along the planet wheel axis so that the radial components of the tooth loads due to the pressure angles of the teeth produce an opposing couple.

2 Claims, 2 Drawing Figures

GEARING

The present invention relates to gearing, and in particular relates to epicyclic gearing having single helical teeth.

Few large gearboxes are designed using single helical teeth because the transmission of torque between the gear wheels through teeth lying at an angle to the axis of rotation of the wheels produces an end load on the wheels. This end load applied on opposite sides of a gear wheel in a gear train produces a tipping moment on the wheel, which is in proportion to the loads transmitted between the teeth of the wheels.

In order to avoid these tipping moments, large gear boxes are usually made with gear wheels having double helical teeth, that is, each wheel has two sets of helical teeth with helix angles of opposite senses, so that the end loads produced on opposite ends of the wheels are balanced and the tipping moment is eliminated.

However, in the manufacture of double helical teeth it requires very accurate machining to produce opposite tooth pairs which can mesh correctly together.

The object of the present invention is to produce a single helical gear train in which the tipping moments are substantially reduced or eliminated.

According to the present invention a gear train comprises first and second gears with an intermediate gear meshing between the two, all the gears having single helical teeth, the first and second gears being arranged to mesh with different axial portions of the teeth of the intermediate gear so that in operation the radial components of the tooth loads on the intermediate gear due to the pressure angles of the teeth, produce a couple which opposes the tipping moment on the intermediate gear due to the helix angle of the teeth.

By omptimizing the helix angle, tooth sizes and widths of the gears, the tipping moment can be eliminated without the intermediate gear becoming impractically long.

Also according to the present invention an epicyclic gear train comprises a sun wheel, a plurality of planet wheels and a surrounding annulus gear, all of which have single helical teeth, each of the planet wheels being mounted on a bearing pin, the sun wheel and the annulus gear being arranged to mesh with different axial portions of the teeth on each of the planet wheels so that in operation the radial components of the tooth loads on the planet wheels due to the pressure angles of the gear teeth produce couples acting on the planet wheels in opposition to the tipping couples on the planet wheels due to the helix angle of the gears.

Figure 2:
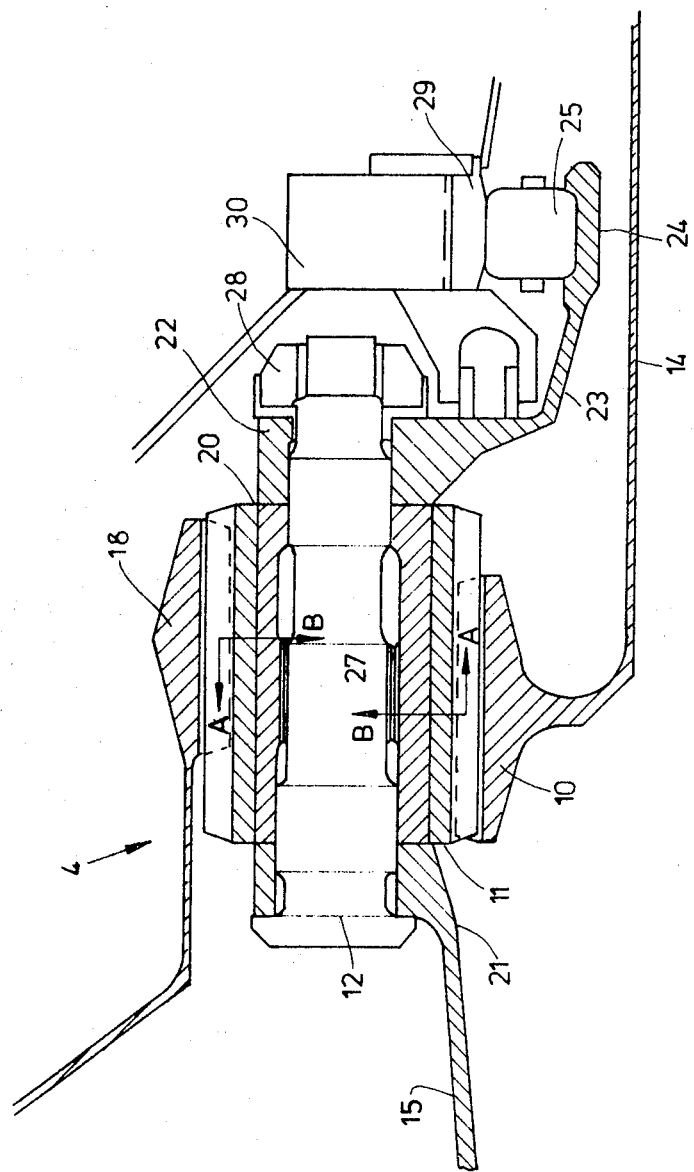

The invention will now be described in more detail, merely by way of example, with reference to the accompanying drawings in which :

FIG. 1 illustrates diagrammatically a gas turbine engine incorporating the gear box of the present invention, and, FIG. 2 is a half-section through the gear box of the engine of FIG. 1.

Referring now to the drawings, FIG. 1 illustrates one application of the invention in a gas turbine engine 1, which comprises a gas generator 2 arranged to drive a fan 3 through a gear box 4. The gas generator 2, which produces the power to drive the fan, may be of any desired type, since the type of the gas generator used is not relevant to the invention. The gas generator will, however, include a compressor 5, combustion equipment 6, and one or more turbines 7, for driving the compressor and the fan.

FIG. 2 illustrates the gearbox 4 in greater detail, and referring now to this figure, there is illustrated an epicyclic gear train comprising a sun wheel, 10, which meshes with a plurality of planet wheels 11 which are supported on bearing pins 12 in a cage for rotation about their own axes. The sun wheel is driven via a shaft 14 from the forward end of the gas generator 2 and the planet wheel cage is connected by a shaft 15 to the fan for driving the fan.

The planet wheels mesh in turn with a stationary annulus gear 18 which causes the planets to rotate about the axis of the engine as well as around their own axes.

The planet cage comprises a plurality of bearing sleeves 20 sandwiched between annular flanges 21 and 22, flange 21 being formed on the end of the shaft 15, and flange 22 being formed on one end of a ring 23 which has at its other end the radially inner race 24 of the main bearing 25 for the cage. Each of the sleeves 20 are splined at 27 to the bearing pin 12 which is formed with several accurately machined diameters to provide an accurate fit in the sleeve 20, and the assembly of sleeves and flanges is clamped by means of a nut 28 which screws onto the end of the pin. The outer race 29 of the bearing 25 is connected to fixed structure 30 which is supported from the outlet guide vanes of the fan.

In the epicyclic gear train described above, all the gear teeth are of single helical form in order to simplify the manufacture of the teeth. This results in there being an end load produced on the various elements in the gear train, and the end forces on opposite sides of the planet wheels (indicated by the arrows A A) cause a tipping moment on the wheels, which tends to tip each wheel in a radial plane about the center of its bearing.

In order to counteract this, the length of the planet wheel is increased and the centers of the sun wheel and annulus gear are offset along the axis of the planet, which results in the sun wheel and annulus gear meshing with different axial portions of the teeth on each of the planet wheels. The portions of teeth on the planet wheels with which the annulus gear and the sun wheel mesh may be totally different or may include a common portion.

By this means the radial components of the tooth loads due to the pressure angles of the teeth on both the sun wheel and annulus gear become offset axially of the planet wheel, and these loads, shown by arrows B B, produce a couple which opposes the tipping couple on the planet wheel.

In order to make sure that the offset between the sun wheel and the annulus gear is kept to a small value so that the planet wheel does not become impractically long, certain criteria are employed in the design of the planet wheel.

First of all an overlap ratio between the teeth of unity is used. This means that only one tooth is in mesh with another tooth at any one time, and this in turn fixes a maximum helix angle for a given wheel.

The second feature employed is to keep the tooth height to a minimum practicable figure and employ more teeth. This brings the teeth closer together so that for the given overlap ratio the helix angle is reduced.

Thirdly, the teeth are made as long as possible, preferably equal to the diameter of the wheel, so that once again the helix angle is kept down.

The result of these three features is that a very low helix angle can be used so that the component of the tooth load A, which provides the tipping couple, is kept to a minimum, and the diameter of the planet wheel is kept low, so that the moment arm between the forces A—A on the drawing is small. Hence the size of the couple is minimized for the planet wheel within the limits set by the various stresses on the wheel.

In a typical example of a gear box according to the present invention the following dimensions were used:

| | |
|---|---|
| Horse power transmitted | 10,000 |
| Number of planets | 9 |
| Dia. of planets | 1.76 in. |
| Length of teeth | 2.28 in. |
| Height of teeth | 0.202 in. |
| Overlap ratio | 1 |
| Number of teeth on planet | 22 |
| Tooth load | 2340 lb. (torque) |
| Helix angle | 8.127° |
| End load due to helix | 328 lb. (per planet) |
| Tipping couple | 587 lb. in. |
| Offset of sun and annulus | 0.472 in. |
| Pressure Angle | 28° |
| Radial component of tooth load | 1245 lb. |
| Restoring couple | 587 lb. in. |

I claim:

1. A simple epicyclic gear train consisting of a single sun wheel, a plurality of planet wheels and a single surrounding annulus gear, all of which have teeth of a single helix angle, wherein the sun wheel and annulus gear are relatively axially displaced along the planet wheels so as to mesh with different axial portions of the teeth on said planet wheels, wherein the radial components of the tooth loads on the planet wheels, due to the pressure angles of the teeth, produce a couple which opposes the tipping moment on the planet wheels due to the sun wheel and annulus gear meshing with teeth of a single helix angle.

2. A simple epicyclic gear train consisting of a single sun wheel, a plurality of planet wheels and a single surrounding annulus gear, all of which have teeth of a single helix angle, wherein the sun wheel and annulus gear are relatively axially displaced along the planet wheels so as to mesh with different axial portions of the teeth of the planet wheels adjacent the ends thereof but with a common portion at the mid-length thereof, wherein the radial components of the tooth loads on the planet wheels, due to the pressure angles of the teeth, produce a couple which opposes and substantially balances the tipping moments on the planet wheels due to the sun wheel and annulus gear meshing with teeth of a single helix angle.

* * * * *